United States Patent
Imran et al.

(10) Patent No.: US 9,854,451 B2
(45) Date of Patent: Dec. 26, 2017

(54) METHODS OF OPTIMIZING TILT ANGLE OF AN ANTENNA

(71) Applicant: QATAR UNIVERSITY QSTP-B, Doha (QA)

(72) Inventors: Ali Imran, Doha (QA); Adnan Abu-Dayya, Doha (QA)

(73) Assignee: QATAR UNIVERSITY QSTP-B, Doha (QA)

( * ) Notice: Subject to any disclaimer, the term of this patent is extended or adjusted under 35 U.S.C. 154(b) by 0 days.

(21) Appl. No.: 14/395,817

(22) PCT Filed: Sep. 24, 2013

(86) PCT No.: PCT/IB2013/058807
§ 371 (c)(1),
(2) Date: Oct. 21, 2014

(87) PCT Pub. No.: WO2015/044708
PCT Pub. Date: Apr. 2, 2015

(65) Prior Publication Data
US 2016/0255509 A1    Sep. 1, 2016

(51) Int. Cl.
| | | |
|---|---|---|
| H04W 16/26 | (2009.01) |
| H04W 16/28 | (2009.01) |
| H04W 24/02 | (2009.01) |
| H04W 4/02  | (2009.01) |
| H04W 24/10 | (2009.01) |
| H04W 64/00 | (2009.01) |
| H04W 84/04 | (2009.01) |

(52) U.S. Cl.
CPC .......... *H04W 16/26* (2013.01); *H04W 4/028* (2013.01); *H04W 16/28* (2013.01); *H04W 24/02* (2013.01); *H04W 24/10* (2013.01); *H04W 64/003* (2013.01); *H04W 84/045* (2013.01); *H04W 84/047* (2013.01)

(58) Field of Classification Search
CPC ... H04W 16/26; H04W 64/003; H04W 4/028; H04W 24/10; H04W 16/28; H04W 24/02; H04W 84/045; H04W 84/047
See application file for complete search history.

(56) References Cited

U.S. PATENT DOCUMENTS

| | | | |
|---|---|---|---|
| 2003/0171123 A1* | 9/2003 | Laakso | H04W 28/18 455/453 |
| 2012/0094653 A1* | 4/2012 | Okuda | H04W 24/02 455/422.1 |
| 2013/0095846 A1* | 4/2013 | Brisebois | H04W 16/28 455/456.1 |
| 2013/0142183 A1* | 6/2013 | Lee | H04W 24/02 370/338 |
| 2013/0143541 A1* | 6/2013 | Henderson | H04W 16/24 455/418 |

(Continued)

*Primary Examiner* — Nathan Mitchell

(57) ABSTRACT

Disclosed is a method of optimizing tilt angle of antennas of a plurality of cells in a wireless cellular system. The method comprising the steps of autonomously determining focal point of each cell of the plurality of cells whose angle of tilt is to be optimized; determining jointly optimal tilt values of the antennas of the plurality of cells based on the determined focal points; and configuring the tilt angle of the antennas of the plurality of cells based on said optimal tilt values.

20 Claims, 8 Drawing Sheets

(56) References Cited

U.S. PATENT DOCUMENTS

| | | | |
|---|---|---|---|
| 2013/0203398 A1* | 8/2013 | Callard | H04W 88/08 455/418 |
| 2013/0324076 A1* | 12/2013 | Harrang | H04W 28/08 455/405 |
| 2015/0011227 A1* | 1/2015 | Wellington | H04W 24/02 455/446 |
| 2015/0189589 A1* | 7/2015 | Legg | H04W 24/10 370/311 |

* cited by examiner

METHODS OF OPTIMIZING TILT ANGLE OF AN ANTENNA

FIELD OF THE INVENTION

The present invention relates to the field of wireless cellular systems, more specifically the invention relates to methods for dynamically maximizing spectral efficiency of both the base station-relay station and base station-user links and further automatically analyzing and optimizing a tilt angle of an antenna in a wireless cellular system.

BACKGROUND OF THE INVENTION

Generally mobile communication systems are formed of a plurality of base stations that provide communication to a plurality of users distributed over an area. The area where the radio communication from the base station is in range is called a cell. The capacity and performance of wireless cellular system in a particular cell largely depends on antenna configuration of its base station.

Antenna tilt is one of the key configuration parameters for a base station. Antenna tilts are known to have significant impact on the capacity and quality of service in wireless cellular systems as they determine the direction and orientation of radio signal propagation and thus can control interference levels and overall performance and capacity of the wireless cellular system. The antenna needs to be adjusted at certain angle in order to adjust the coverage area of the base station antenna signals.

In current wireless cellular systems, the antenna tilts are updated manually either after laps of a fixed time period or only when significant performance reduction is observed. The conventional method to determine optimal tilting angle of antenna involve in-field drive tests to collect data which can be fed into an offline planning tool for determining a new tilt value based on heuristic calculations.

Such an exercise is a time consuming process and it requires skilled labor resources, thus making it expensive. Another disadvantage of this method is that, by the time new tilts of the antennas are configured, they can be already outdated. Hence, the antenna tilts in a wireless cellular system cannot be often set and maintained at optimal values.

The general methodology followed in conventional method of optimizing tilt angle of an antenna is by evaluating desired key performance indicators as a function of tilting angle of the antenna through a simulation model. A non exhaustive search is then carried out by exploration of the solution space in vicinities selected with the help of a heuristic method for obtaining the suitable tilt values. The problems of this method include the limited transparency of simulation model, inherent lack of guarantee of optimal value, and that the quality of outcome is hard to be asserted.

Further, the above method is time consuming and the reliance on offline planning tools thwarts practical implementation for tilting angle of an antenna in real time.

In addition to these drawbacks, no known methods of tilt optimization take into account generic scenarios of heterogeneous deployments where relay stations are deployed.

Therefore, there exists a need of improved means to effectively optimize and maintain antenna tilts autonomously in wireless cellular systems—homogeneous or heterogeneous—in response to their spatio-temporal dynamics that allows deeper insights and better control of the wireless cellular system for continuously maintaining optimal performance in a more transparent, secure, cost effective, and environment friendly manner.

OBJECT OF THE INVENTION

In view of the foregoing disadvantages inherent in the prior arts, the general purpose of the present invention to overcome the limitations of the existing art and to provide an improved optimization methodology through which a wireless cellular system can autonomously optimize tilt angles of antennas in a live network.

It is another object of the present invention to provide a tilt optimization methodology that can maintain better performance in ever changing user distribution dynamics faced by typical wireless cellular systems.

It is yet another object of the present invention to provide a method for real time calculation, setting, optimizing and maintaining tilt angle of antennas in a wireless cellular system that can enhance performance of the wireless cellular system.

It is yet another object of the present invention to provide a method of optimizing tilt angle of antennas in a wireless cellular system that can be implemented with existing standard technology.

It is another object of the present invention to provide a method of optimizing tilt angle of antennas in a distributed manner or centralized manner in a wireless cellular system.

It is another object of the invention to overcome the drawback of spectrum reuse inefficiency caused by extra spectrum required for base station-relay station access link.

It is another object of the invention to optimize the spectral efficiency of access links to have more spectrum for base station users and relay station users.

SUMMARY OF THE INVENTION

In view of the foregoing disadvantages inherent in the prior arts, the general purpose of the present invention is to provide an improved means of optimizing tilt angle of antennas in a wireless cellular system, to include the advantages of the prior art, and to overcome the drawbacks inherent therein.

The present invention may be implemented by way of a number of embodiments including but not limited to centralized, distributed, on-line, and semi-online.

In accordance with an embodiment, the invention provides a method of optimizing tilt angle of antennas in a wireless cellular system in a distributed manner or centralized manner. In case of implementation in a centralized manner the entire cells in the wireless cellular system are considered and in case of implementation in a distributed manner, a set of cells generally referred as a cluster of cells in the wireless cellular system are considered.

In accordance with an embodiment, the invention provides a method of optimizing tilt angle of antennas of a plurality of cells in a wireless cellular system. The method comprises the steps of: autonomously determining focal point of each cell of the plurality of cells whose angle of tilt is to be optimized; determining jointly optimal tilt values of the antennas of the plurality of cells based on the determined focal points; and configuring the tilt angle of the antennas of the plurality of cells based on said optimal tilt values.

The present invention further provides for different methods for the determination of focal point of each cell of the wireless cellular system during the process of optimization of tilt angle of antennas in the wireless cellular system implemented either in a centralized or distributed manner.

In accordance with another embodiment, the present invention provides a method of autonomously determining focal point of a cell intended for base station-user link optimization based on user demographics in a wireless cellular system. The method comprises the steps of: dividing each cell of the plurality of cells into a finite number of virtual bins; gathering user measurement report from each bin from the finite number of virtual bins; assigning a weight to each virtual bin representing the significance of the bin; ascertaining whether a focal point update is required for each cell based on the weightage assigned to each bin of the each cell; upon ascertaining that the focal point update is required, determining a value of tilt of the cell that maximizes the weighted average spectral efficiency achievable in all the bins of each of the cells, where weights used in calculating the average across all bins are the weights assigned to those bins; mapping the determined value of tilt into a locus of points of the cell; determining a point on the locus that minimizes the weighted sum distance from all virtual bins in the cell, where weights used here are the weights assigned to the bins; and setting said point on locus as the focal point of the cell.

In accordance with another embodiment, the present invention provides a method of autonomously determining focal point of a cell intended for base station-relay station link optimization and to minimize interference at femto cells in a wireless cellular system. The method comprises the steps of: gathering configuration parameters of each cell of the plurality of cells in the wireless cellular system; ascertaining whether a focal point update is required for each cell based on configuration parameters of the each cell; allocating and storing physical location value of a relay station or a femto cell as the focal point of the cell when there is only one relay station or femto cell within the cell; and assigning weightage to the focal point of the cell depending on significance of the relay station or femto cell. If there are pluralities of relay station or femto cell within the cell, the focal point is determined through the same process as user demographics based focal point calculation, by considering the physical location of the plurality of relay station or femto cell as physical location of users.

In accordance with yet another embodiment, the present invention provides a method of autonomously determining focal point of a cell intended for enhancing coverage at coverage holes or service holes in a wireless cellular system. The method comprises the steps of: gathering user measurement reports in each cell of the plurality of cells in a wireless cellular system; ascertaining whether a focal point update is required for each cell based on user measurement reports of the each cell; determining a point in the cell of the wireless cellular system with coverage or service level below threshold; and setting the point with coverage or service level below threshold as focal point of the cell, when there is only one point with coverage below threshold level in the cell. If there are pluralities of points with coverage level or service level below threshold within the cell, the focal point is determined through the same process as user demographics based focal point calculation, by considering the physical location of the plurality of points with coverage level or service level below threshold as physical location of users.

In accordance with another embodiment, the present invention provides a method for real time calculation of the optimal tilt values and optimizing the tilt angle of antennas in a wireless cellular system.

In accordance with another embodiment, the present invention provides an analytical framework for maximizing spectral efficiency of both base station-relay station and base station-users link in real time.

In accordance with yet another embodiment, of the present invention provides a method to configure the new tilt value in an antenna of a wireless cellular system remotely and autonomously through electronic tilting and configuring the antenna to an optimal tilt angle.

In accordance with another embodiment, the present invention provides a semi-online method for determining the focal point of a cell in a wireless cellular system and optimizing the tilt angle of antennas for enhancing the spectral efficiency.

These together with other aspects of the invention, along with the various features of novelty that characterize the invention, are pointed out with particularity in the claims annexed hereto and forming a part of this disclosure. For a better understanding of the invention, its operating advantages and the specific objects attained by its uses, reference should be had to the accompanying drawings and descriptive matter in which there are illustrated exemplary embodiments of the invention.

BRIEF DESCRIPTION OF DRAWING

While the specification concludes with claims that particularly point out and distinctly claim the invention, it is believed that the advantages and features of the present invention will become better understood with reference to the following more detailed description of expressly disclosed exemplary embodiments taken in conjunction with the accompanying drawings. The drawings and detailed description which follow are intended to be merely illustrative of the expressly disclosed exemplary embodiments and are not intended to limit the scope of the present invention as set forth in the appended claims. In the drawings:

Like reference numerals refer to like parts throughout the several views of the drawings.

DETAILED DESCRIPTION OF THE INVENTION

Figure 1:
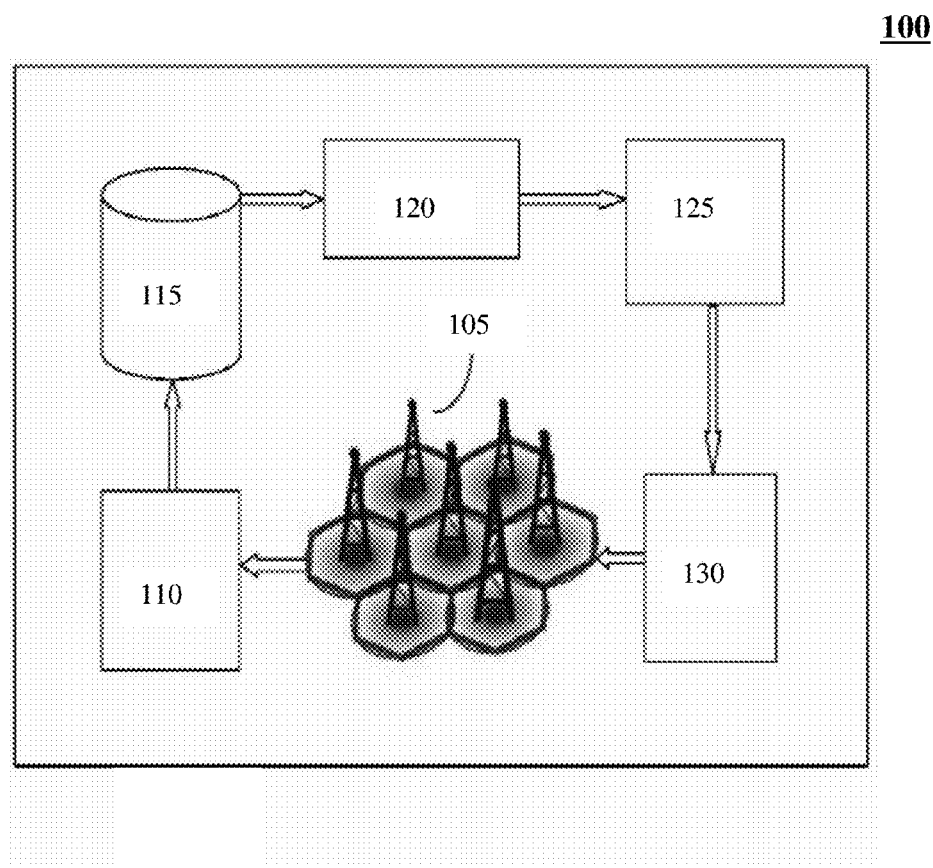
FIG. 1 is a prior art system block diagram and explains the methodology used for optimizing tilt angle of an antenna in a wireless cellular system.

The exemplary embodiments described herein detail for illustrative purposes are subject to many variations. It should be emphasized, however that the present invention is not limited to particular method of optimizing tilt angle of antennas in a wireless cellular system as described. Rather, the principles of the present invention may be used with a variety of configurations and structural arrangements for optimizing tilt angle of antennas. It is understood that various omissions, substitutions of equivalents are contemplated as circumstances may suggest or render expedient, but the present invention is intended to cover the application or implementation without departing from the spirit or scope of the its claims.

In the following description, for purposes of explanation, numerous specific details are set forth in order to provide a thorough understanding of the present invention. It will be apparent, however, to one skilled in the art that the present invention may be practiced without these specific details.

As used herein, the term 'plurality' refers to the presence of more than one of the referenced item and the terms 'a', 'an', and 'at least' do not denote a limitation of quantity, but rather denote the presence of at least one of the referenced item.

Below is a glossary providing explanations of certain terms of common usage in the art to which the present invention relates.

| Glossary | |
|---|---|
| Optimization (of tilt angle) | Process of finding a value of tilt angles that maximizes a desired performance objective in the cellular system |
| Antenna tilt | Vertical orientation of the antenna |
| Wireless cellular system | A plurality of cells |
| Cells | Areas covered by individual antennas of the base stations |
| In-field drive test | Process in which skilled personnel drive through the coverage area of wireless cellular system and use specific signal sensing and measurement equipment, to estimate the quality of service perceived by user. |
| Centralized implementation | An implementation in which all information is passed to and all decisions are made at a single central processing unit. |
| Distributed implementation | An implementation in which information is exchanged within a local group of cells and the decisions are made within that local group of cells. |
| Cluster of Cells | A group of cells. The group is formed to facilitate distributed implementation of the invention. |
| Cluster Head | A base station within cluster of cells that acts as local processing unit. It receives the required information from all the cells within the cluster, determines the optimal tilt based on this information and passes the new optimal tilt values back to the respective cells within the cluster. |
| Focal Point of a cell | A geographical point within a cell that, in the tilt optimization process, can be used as sole representation of the user demography or relay station or femto cell deployments within that cell. |
| KPIs | Key Performance Indicators i.e. objective metrics in the optimization process. |
| Virtual bins | Small segments into which the area of wireless cellular system is virtually divided |
| Spectral efficiency | A measure of radio link efficiency (in bits/second/Hz) that is used as one the many possible KPIs, to demonstrate gain of the tilt optimization process |
| Base station | A radio tower and associated equipment that projects a cell in a wireless cellular system and provides radio service to the users within that cell. |
| Relay station | A small radio tower and associated equipment that relays the signal from/to user to/from base station. |
| Femto cells | A cell much smaller than the cell projected by conventional base station |
| Configuration parameters | The parameters of a base station antenna that determine the shape and size of a cell e.g. height of antenna, horizontal and vertical beam widths, maximum gain and transmission powers etc. |

Referring to FIG. 1 which illustrates a prior art system block diagram (100) and explains the methodology used for optimizing tilt angle of antennas in a wireless cellular system. The prior art system includes a wireless cellular system (105) comprising a plurality of cells (not numbered). The performance data of the wireless cellular system (105) is collected via in-field drive test (available in the art) or through user reported measurements (110). The data thus collected is then fed into a database (115) and a performance analysis is carried out separately (120) for observing any anomalies or deterioration in performance of the wireless cellular system (105). The outcome of the performance analysis is fed into an offline planning tool (125) to calculate new tilt value. The tilt values thus calculated are set either remotely or manually by dispatching a skilled labor at (130) to individual base stations in the wireless cellular system (105).

Figure 2:
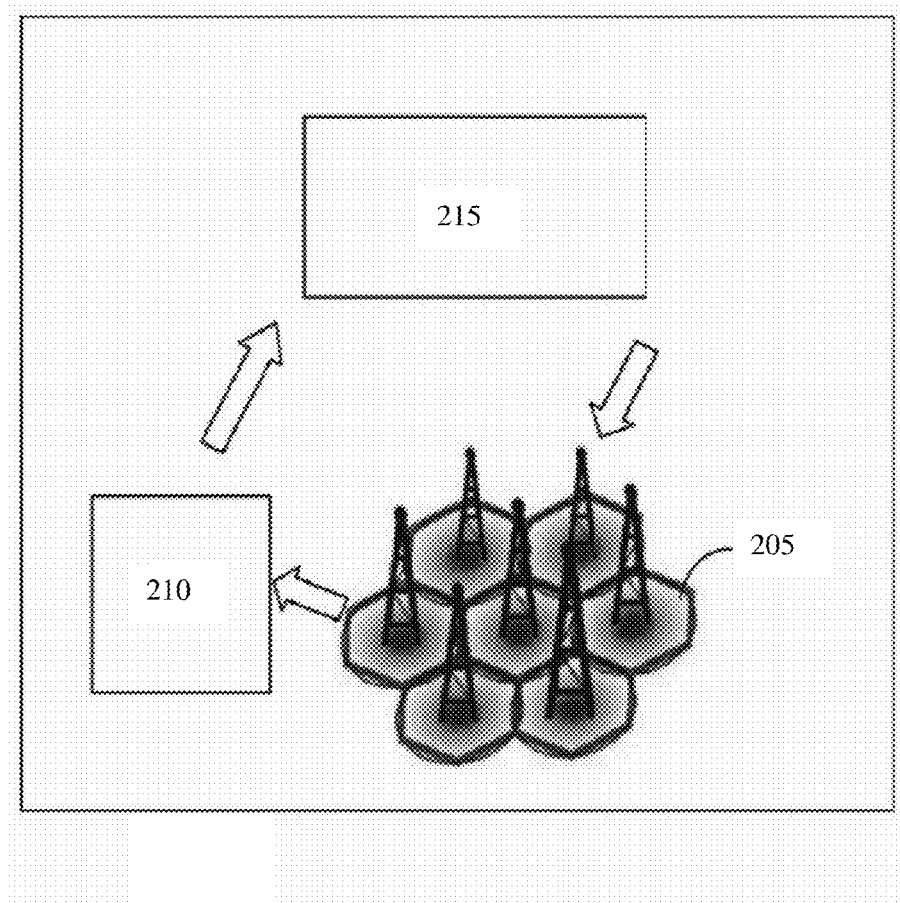
FIG. 2 is a block diagram of a system explaining the method used for optimizing tilt angle of an antenna in a wireless cellular system, according to an exemplary embodiment of the present invention.

Referring to FIG. 2 which is a representative block diagram of a system (200) explaining a method used for optimizing tilt angle of antennas in a wireless cellular system (205), according to an exemplary embodiment of the present invention. The wireless cellular system (205) includes a plurality of cells (not numbered), a plurality of base stations (not shown) and a plurality of antennas (not numbered) whose tilt angle needs to be optimized. The methodology includes collecting user demography reports (210) from the plurality of cells in the wireless cellular system (205) and based on the same, focal point (also referred to as 'Centre of Gravity') of each cell is determined (215) autonomously. An optimal tilt value for each antenna is jointly calculated (215) based on these focal points and finally the tilt angle of the antenna of each cell is set remotely and autonomously in a real time through electronic tilting, thereby eliminating the need of human resources in tilting the angle of the antennas.

The present invention may be implemented by way of a number of embodiments including but not limited to centralized, distributed, on-line, and semi-online.

The present invention provides for a method of optimizing tilt angle of antennas in a wireless cellular system having a plurality of cells. In an embodiment of the present invention, the method may be implemented in a centralized manner in a situation wherein a system-wide tilt optimization of the wireless cellular system is desired and wherein the complexity of such centralized implementation is affordable. More specifically, the implementation is undertaken in a centralized manner when the number of cells in a wireless cellular system is limited. The optimization of tilt angle of antennas may be carried out system-wide wherein the calculated focal point is sent to a single central processor within the wireless cellular system for jointly determining the optimal tilt values of the antennas based on the determined focal points of the cells of the wireless cellular system.

In another embodiment of the present invention, the method may be implemented in a distributed manner. The distributed approach is taken when there are a large number of cells in a wireless cellular system. In the distributed approach, the wireless cellular system is divided into a plurality of groups or cluster of cells formed of a smaller number of cells (as shown in FIG. 3).

Figure 3:
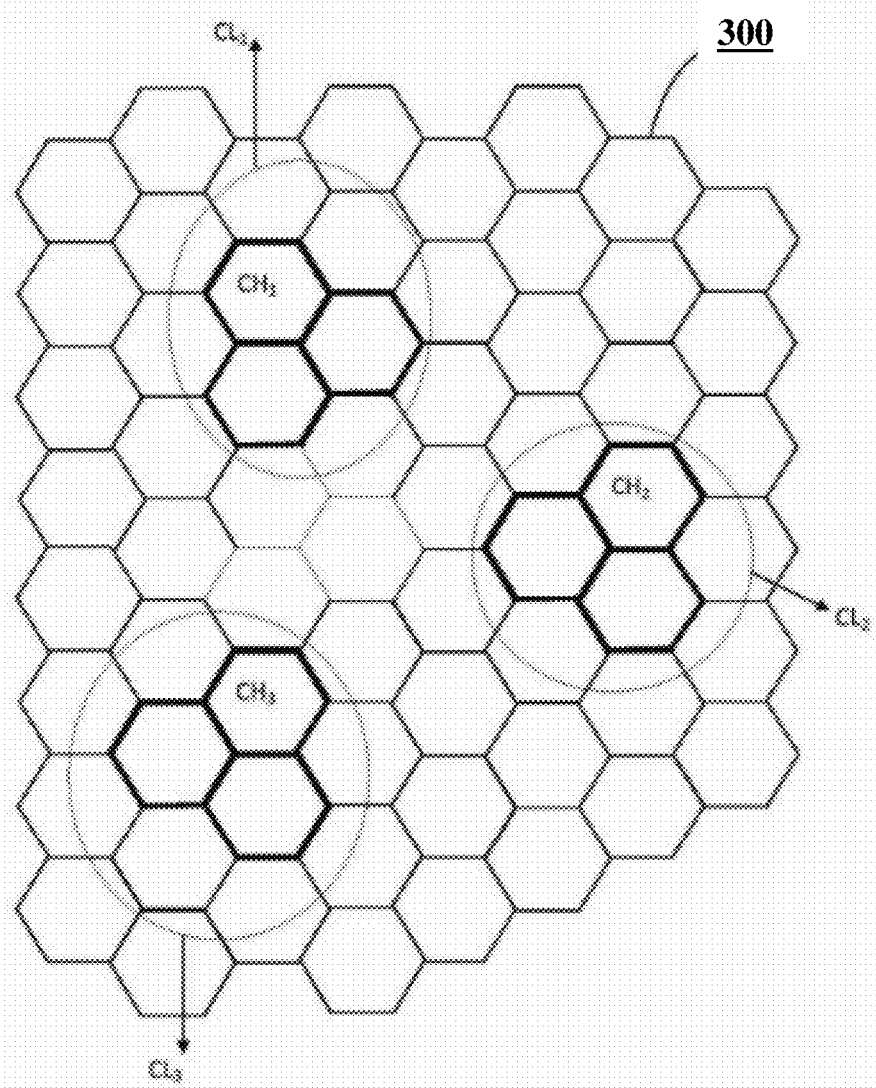
FIG. 3 illustrates a wireless cellular system wherein the method of optimizing tilt angle of antennas in a wireless cellular system implemented in a distributed manner, according to an exemplary embodiment of the present invention.

Referring to FIG. 3 which illustrates a wireless cellular system (300) wherein the method of optimizing tilt angle of antennas in a wireless cellular system (300) is to be implemented in a distributed manner, according to an exemplary embodiment of the present invention. The wireless cellular system (300) is divided into a plurality of groups or cluster of cells such as cluster of cells $CL_1$, $CL_2$ and $CL_3$ (e.g. triplet of cells), as represented. The tilt optimization process may be carried out within each cluster of cells independently while considering the determination of focal points and tilt angle of antennas in that cluster only. Furthermore, one cell of a cluster of cells is designated as a cluster head. For example, $CH_1$, $CH_2$ and $CH_3$ are designated as cluster heads amongst the cluster of cells $CL_1$, $CL_2$ and $CL_3$ Each cluster head such as cluster head $CH_1$, $CH_2$ and $CH_3$ is capable of receiving the autonomously determined focal point of each cell of the cluster of cells. The cluster head then determines the optimal tilt value of the antenna of the each cell of the cluster of cells, and forwards the optimal tilt value of the antenna to each cell of the cluster of cells for configuring the tilt angle of each antenna of the cluster of cells.

Figure 4:
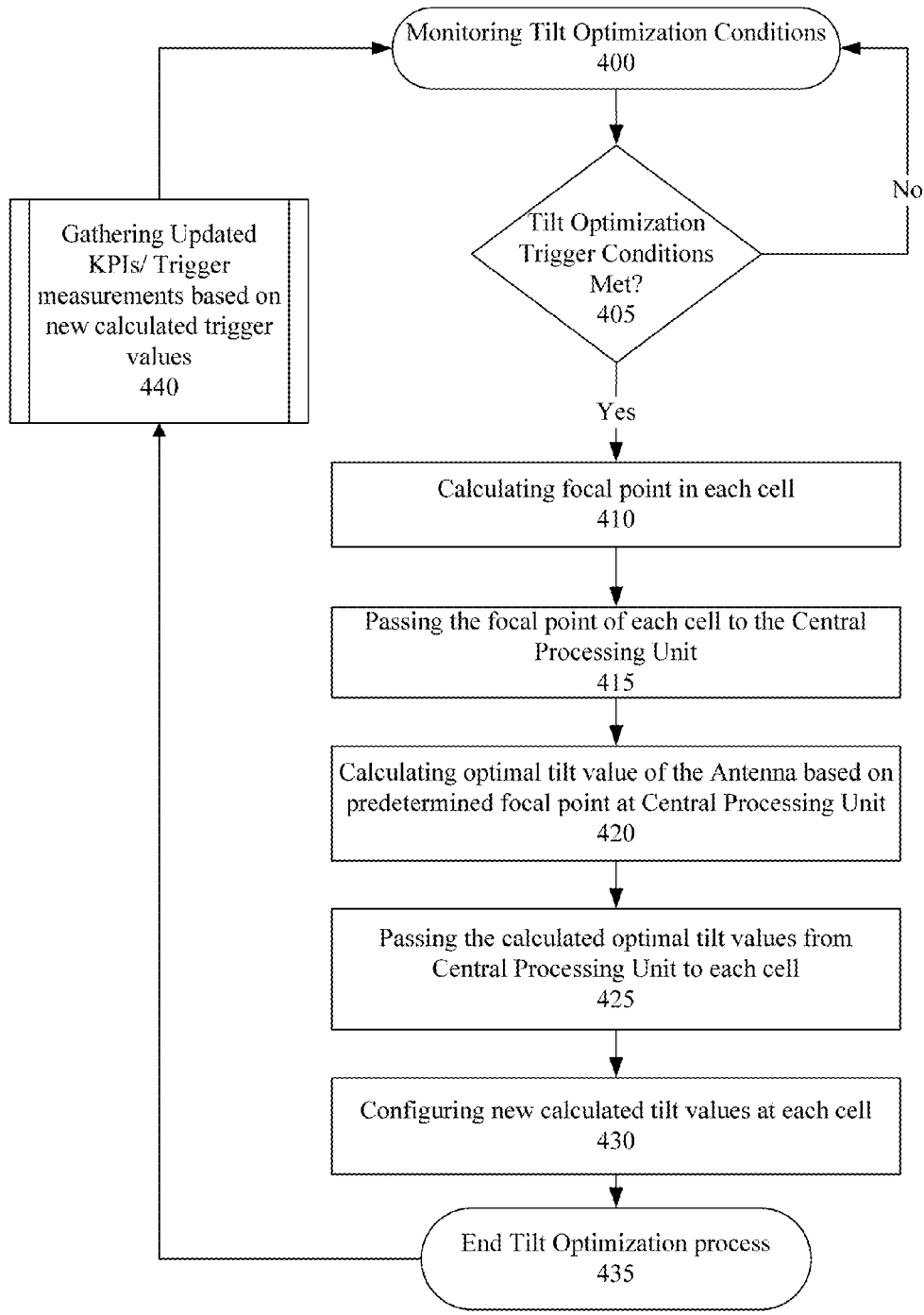
FIG. 4 illustrates a flow chart for optimization of tilt angle of an antennas of a plurality of cells in a wireless cellular system in a centralized manner, according to an exemplary embodiment of the present invention.

Referring to FIG. 4 which illustrates a flow chart for optimization of tilt angle of antennas in a wireless cellular system in a centralized manner, according to an exemplary embodiment of the present invention. The method comprises steps of monitoring the tilt optimization conditions at (400) which can be set to be met by observing certain level of deterioration in the KPI measurements or based on optimization schedules, or operator policy or the dynamics of user demography. The tilt optimization trigger conditions are checked at (405) and if the conditions are met the focal point in each cell is calculated at (410). If tilt optimization trigger conditions are not met, it may return to monitor tilt optimization conditions at (400). The calculated focal point of one or more cell is passed on to a central processing unit (415) of the wireless cellular system and said central processing unit jointly calculates the optimal tilt values of the antennas based on the determined focal points at (420). The calculated optimal tilt values at step (420) is passed on to each cell of the wireless cellular system at (425) and further the new calculated optimal tilt value at each cell is configured at (430) to tilt the antenna to a new tilt angle to end tilt optimization process at (435). Once the tilt angle is configured at each antenna, the optimized parameter values with regard to KPIs/Trigger Measurements are gathered at (440) for future comparative performance analysis to optimize the tilt of antennas again when needed.

Figure 5:
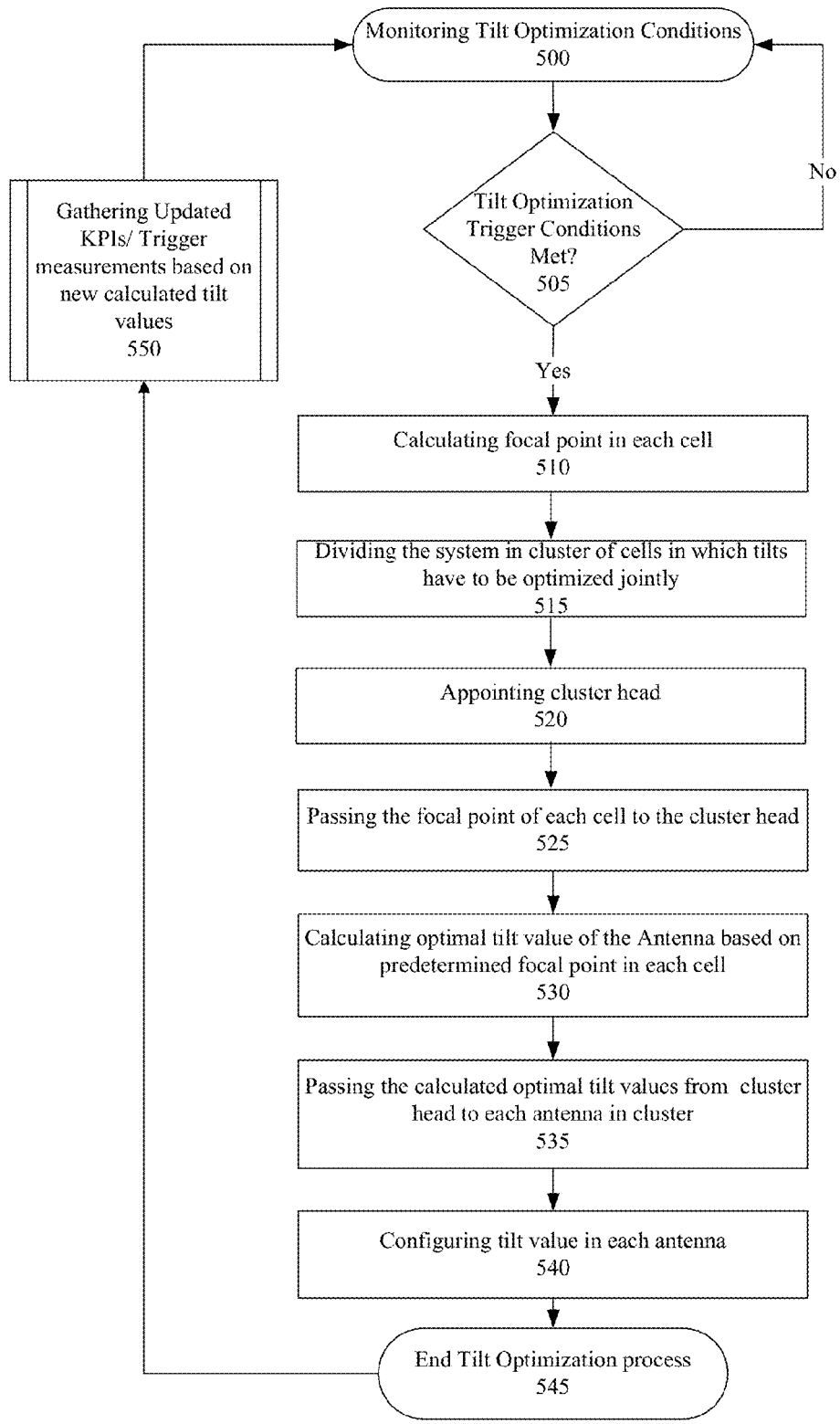
FIG. 5 illustrates a flow chart for optimization of tilt angle of antennas of a plurality of cells in a wireless cellular system in a distributed manner, according to an exemplary embodiment of the present invention.

Referring to FIG. 5 which illustrates a flow chart for optimization of tilt angle of antennas in a wireless cellular system in a distributed manner, according to an exemplary embodiment of the present invention. The method comprises the steps of monitoring tilt optimization conditions at (500) which can be set to be met by observing certain level of deterioration in the KPI measurements or based on optimization schedules, or operator policy or the dynamics of user demography. The tilt optimization trigger conditions are checked at (505) and if the conditions are met, the focal point in each cell is calculated at (510). If tilt optimization trigger conditions are not met, it may return to monitor tilt optimization conditions at (500).

To enable a distributed implementation of the present invention, the wireless cellular system may be divided into a plurality of clusters of cells at (515) in which tilts have to be optimized jointly. The tilt optimization process in a distributed manner may be carried out within each cluster independently while considering focal points and tilts of the cells within that cluster only. The advantage of this distributed implementation vis-à-vis the centralized implementation is that system-wide signaling to a single central processing unit is not required anymore. While optimizing the tilts each cluster is capable of processing the information within the cluster independently without requiring information exchange to/from other clusters in the wireless cellular system.

Once the wireless cellular system is divided into a plurality of cluster of cells at (515), a cluster head is appointed at (520) to each cluster of cells. The calculated focal point for each cell of the cluster of cells at (510) is passed on to the cluster head at (525). Once the focal point of each cell in the cluster of cells is known at the cluster head, an optimization problem based on three dimensional model of antenna pattern and location of the focal points within the cluster is modeled and solved at the cluster head and an optimal tilt value with respect to the predetermined focal point of each cell of the cluster of cells is calculated at (530). The calculated optimal tilt value at (530) is passed from the cluster head of each cluster of cells to each antenna in the cluster of cells at (535) and said each antenna is configured to adopt said optimal tilt value at (540) to tilt each antenna to a new angle of tile to end the tilt optimization process at (545) of a wireless cellular system in a distributed manner. Once the tilt angle is configured at each antenna, the optimized parameter values with regard to KPIs/Trigger Measurements are gathered at (550) for future comparative performance analysis to optimize the tilt angle of antennas again when needed.

The advantage of optimization of tilt angle of antennas in a wireless cellular system in a distributed manner is that the system wide signalling to a single central processing unit is avoided. The optimization of the tilt angle in each cluster can process the information within it independently without requiring information to/from other clusters in the system.

The size of the cluster can be determined based on sectorisation, topology and frequency reuse pattern of the wireless cellular system. However, signalling overhead and computation complexity will increase with large cluster size. The KPIs/trigger measurements gathered for triggering calculation of updated focal point and hence tilt optimization process comprises location of users, relay stations, femto cells and the activity levels within the cell.

The present invention further provides for different methods for the determination of focal point of each cell of the wireless cellular system during the process of optimization of tilt angle of antennas in the wireless cellular system implemented either in a centralized or distributed manner.

Figure 6:
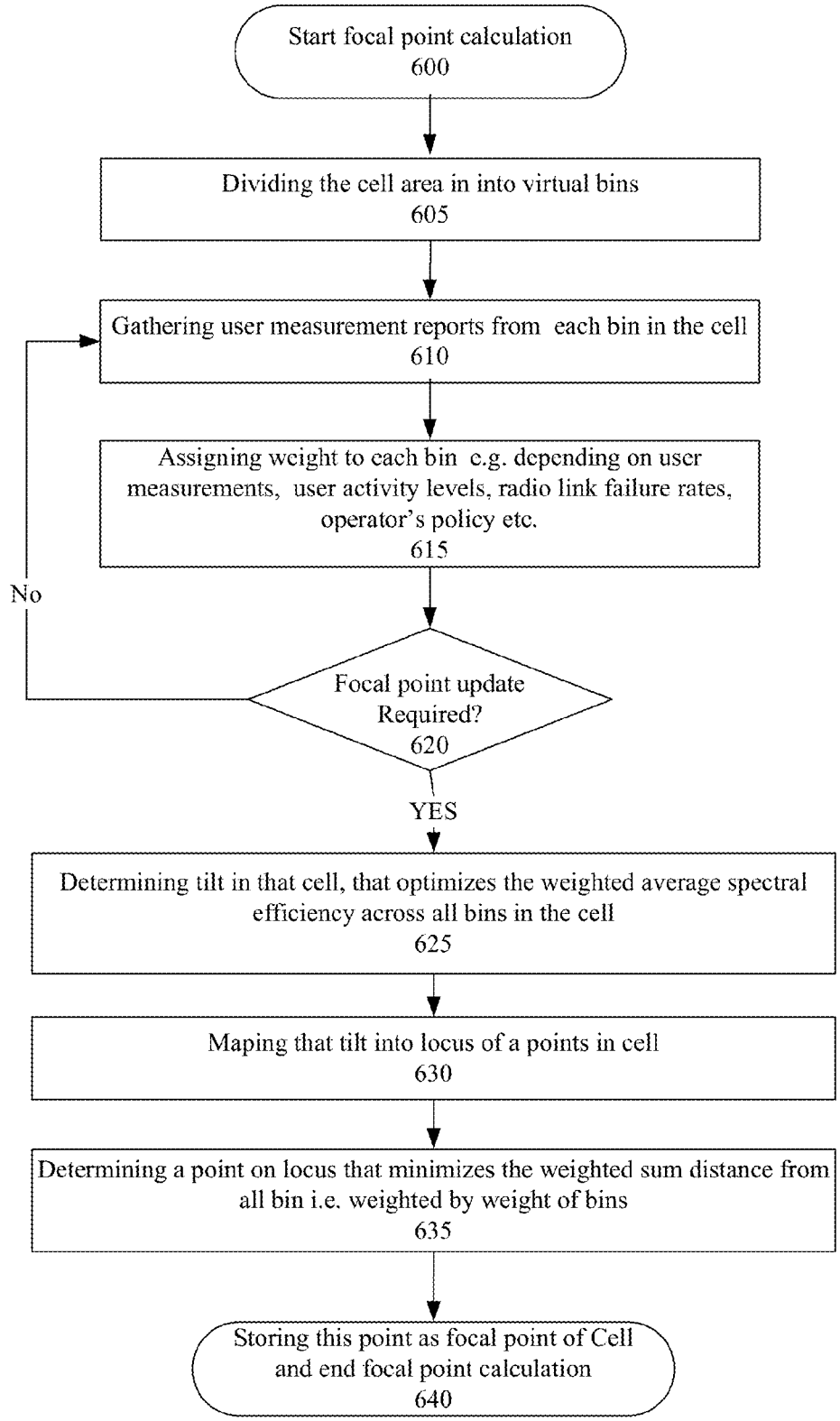
FIG. 6 illustrates a flow chart determining focal point of cell in a wireless cellular system intended for base station-user link optimization based on user demographics, according to an exemplary embodiment of the present invention.

In an embodiment of the present invention, focal point of a cell in a wireless cellular system is determined based on user geographical distributions and activity levels. FIG. 6 illustrates a flow chart for determining focal point of cell intended for base station-user link optimization based on user demographics in a wireless cellular system. The method illustrated in FIG. 6 comprises initiating calculation of focal point of a cell in a wireless cellular system at (600) which is followed by dividing each cell into a finite number of virtual bins at step (610). The function of the virtual bin is to covert infinite spatial points required to mathematically represent the area of a cell into finite number of small spatial segments. Once each cell is divided into virtual bins, user measurement data is gathered from each virtual bin in the cell at (615). Each virtual bin is then assigned a weight at (620) to represent the significance of the segment of the area of cell it represents. These weights can be determined as a function of a number of parameters including but not limited to user density and user activity levels, radio link failure rates, and significance of that segment of the area in operator's service policy. The method then proceeds to check for focal point update requirement at (620). Focal point update is required if new weights have to be assigned to one or more bins. In this case the method proceeds to determine the tilt value in each cell at (625) that that maximizes the weighted average spectral efficiency achievable in all the bins of each of the cells, where weights used in calculating the average across all bins are the weights assigned to those bins.

The weighted average instead of the simple average is used so that the weights assigned to each bin can be used to reflect its importance and accordingly, the bins that are more important will have a stronger impact in determining the final optimal tilt.

The determined tilt value at (625) is mapped in to a locus of points in each cell of a wireless cellular system at (630). A locus according to the present invention, is a set of points in a cell towards which antenna's vertical boresite is directed when set at the determined tilt value at (625). A single point within said locus that minimizes the weighted sum distance from all bins in that cell is determined at (635) and stored as focal point of each cell at (640), wherein weights used here are the weights assigned to the bins. This focal point is then used as the representative of the cell area in the rest of the process for optimizing the tilt angle that is carried out jointly among a plurality of cells. The key purpose of determining a focal point based on user demographics is to simplify the process of optimizing tilt angle of antennas among multiple cells.

Figure 7:
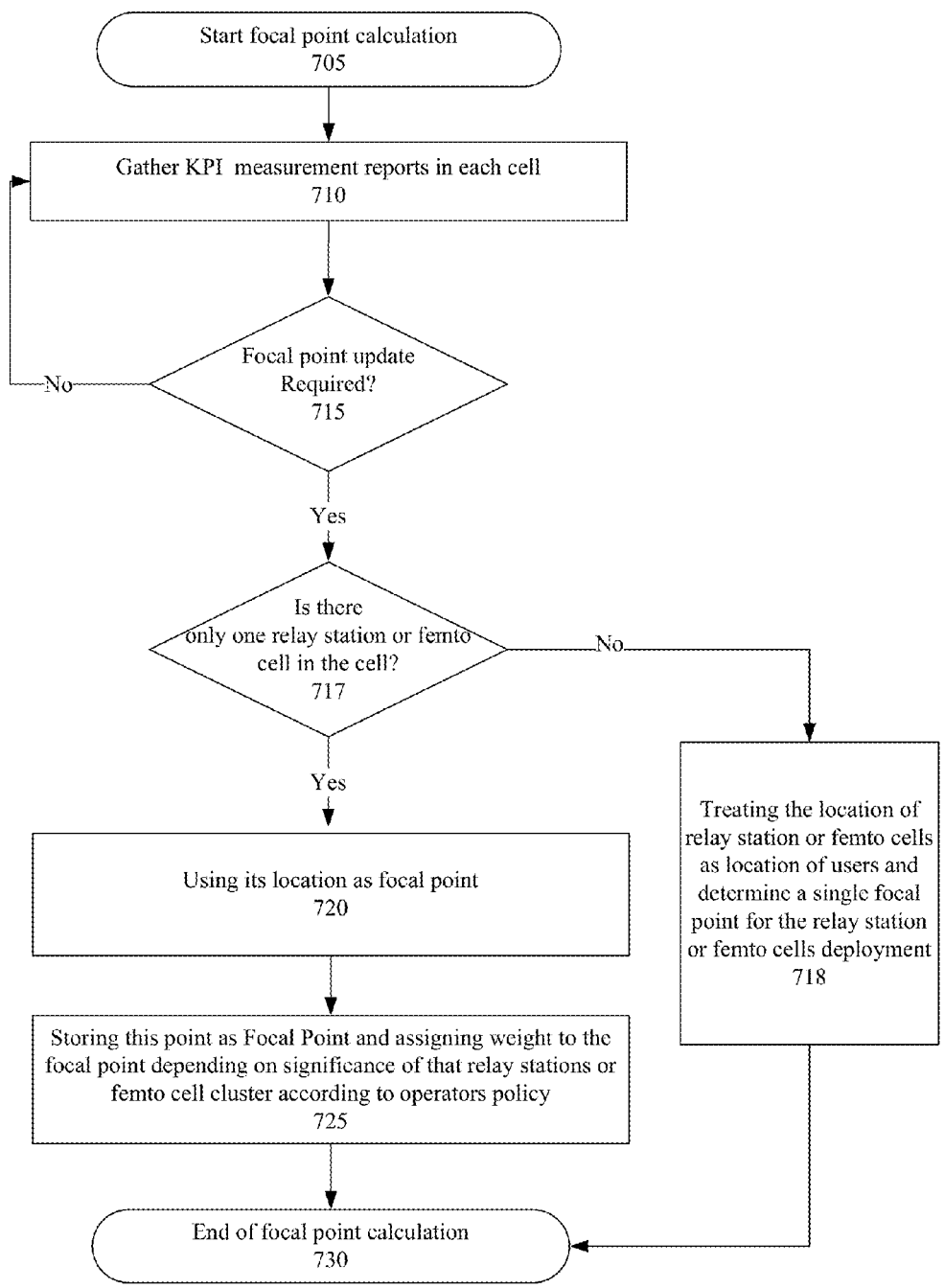
FIG. 7 illustrates a flow chart determining focal point of cell in a wireless cellular system intended for base station-relay station link optimization or to minimize interference at femto cells, according to an exemplary embodiment of the present invention.

In an embodiment of the present invention, focal point of a cell in a wireless cellular system is determined based on relay station or femto cell locations. FIG. 7 illustrates a method for determining focal point of cell intended for base station-relay station link optimization or to minimize interference at femto cells. This method of determining focal point of the cells is applicable, when optimization of tilt angle is to be conducted in order to maximize the spectral efficiency of the relay station-base station links or to minimize interference from the base station to the femto cells. The method comprises initiating calculation of focal point of a cell at (705) followed by gathering KPI measurement report in each cell at (710). At (715) the method then proceeds to check whether focal point update is required by observing any deterioration in the KPIs gathered at (710). In addition to KPI deterioration, the need for focal point update may also arise if user demography or any of the configuration parameters of the base station has changed, or relay station location or their configuration has changed. If a focal point update is not required at (715) the method may return to user measurement report gathering phase in each cell at (710). If a focal point update is required the method then proceeds to check the number of relay station and femto cell in the cell at (717). If only one relay station or femto cell is located in a cell, the physical location of such relay station or femto cell location is stored as the focal point of the cell at (720) and further weightage is assigned to the focal point of the cell depending on significance of the relay station or femto cell at (725). In case there are more than one relay stations or femto cells in the cell as determined at (718), the focal point of the cell is calculated by treating the physical location of such relay stations or femto cells as location of users and by applying the focal point calculation process as shown in FIG. 6 and as explained above.

Figure 8:
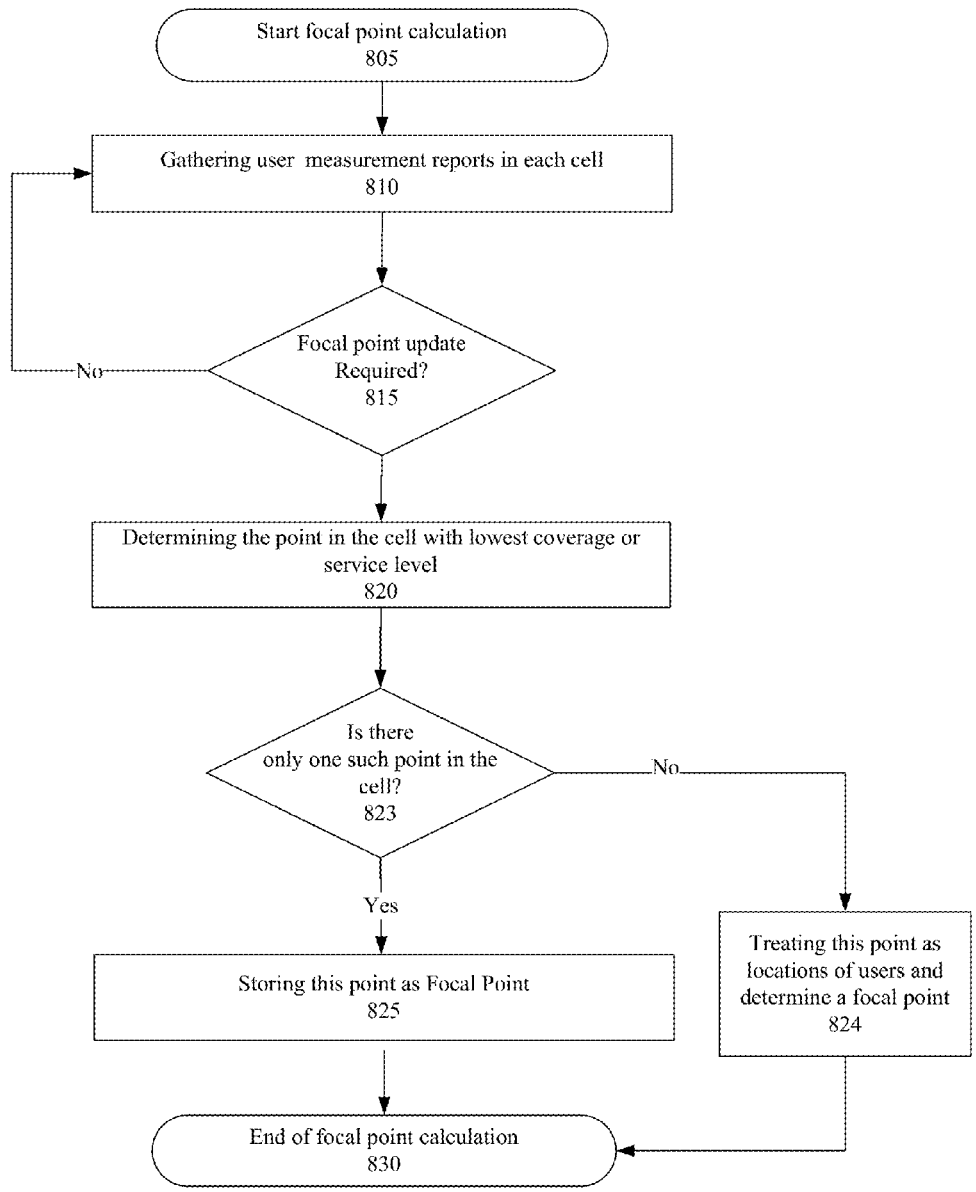
FIG. 8 illustrates a flow chart determining focal point of cell in a wireless cellular system intended for enhancing coverage at coverage holes or service holes, according to an exemplary embodiment of the present invention.

In an embodiment of the present invention, focal point of a cell in a wireless cellular system is determined based on coverage. FIG. 8 illustrates a flow chart for determining focal point of cell based on coverage levels. This method of determining focal point is applicable when the optimization of tilt angle has to be conducted to minimize coverage or service holes. Coverage or service holes are the locations within the wireless cellular system where the radio signal strength received by a base station is below a threshold level to maintain radio link. The method comprises initiating calculation of the focal point at (805) followed by gathering user measurement report in each cell at (810). The report gathering at (810) is through user measurement reports and may also be done by any alternative performance evaluation means e.g. drive tests. The method then proceeds to check for focal point update by observing any deterioration in the KPIs gathered at (815). In addition to KPI deterioration, the need for focal point update may also arise if user demography or any of the configuration parameters of the base station has changed as determined at (815).

If a focal point update is not required at (815) it may return to keep gathering user measurement report in each cell at (810). If a need for focal point update is established, the method then proceeds to determine a point within the cell with coverage or service level or low spectral efficiency below threshold at (820). The method checks the number of points that have coverage or service level below a threshold at (823), and if there are more than one such points in the cell that have below threshold coverage or service level is determined at (824), the focal point of the cell is calculated by considering such points as location of users and then applying the focal point calculation process shown in FIG. 6 and as explained above. If there is only one such point in a cell determined at (823) this point is stored as focal point of the cell at (825).

The present method of optimization of tile angle of antennas in plurality of cells in a wireless cellular system can be implemented with existing technology as it does not require base stations to have capabilities beyond what state of the art capabilities the base stations have. For implementation of the aforesaid method with existing standard technology the base station of each cell in a wireless cellular system just needs to have the capability to know user's, relay station and/or femto cell position information to determine the focal point of their cell.

In another embodiment of the invention, said method can be performed semi-online which will not require real time positioning of user information, but it rather rely on long term measured traffic data profile of area of interest to determine the focal point of a cell and their spatio temporal movement patterns. In this case, base station in each cell can log statistics of user movements and demography over long period of time to establish a stable pattern of the user activity and concentrations in time and space. Using this data, the time intervals can be determined in which user demography and hence the focal points stay unchanged. Further using this data, the most probable focal point locations for given time interval can be determined empirically instead of relying on live and instantaneous knowledge of individual user locations. Such statistically estimated focal point can then be used to determine and update optimal tilts in respective time intervals. In case of periodic re-execution, the time period of re-execution of tilt optimization can range from hours to weeks and can be set based on the statistics of long term measures of traffic data profile of area of interest.

In another embodiment of the invention, said method is valid for heterogeneous deployments as well as macro cell based deployments. In heterogeneous deployments, the solution can maximize spectral efficiency on relay station-base station wireless backhaul links by determining the focal point of each cell based on the location of the relay stations in it as illustrated in FIG. 7 and as explained above.

In various exemplary embodiments of the present invention, the method discussed herein, e.g., with reference to FIGS. 2 to 8, may be supplemented with operations that may be implemented through computing devices such as hardware, software, firmware, or combinations thereof, which may be provided as a computer program product, e.g., including a machine-readable or computer-readable medium having stored thereon instructions or software procedures used to program a computer to perform a process discussed herein. The machine-readable medium may include a storage device.

In other instances, well-known devices, methods, procedures, components, and circuits have not been described herein so as not to obscure the particular embodiments of the present invention. Further, various aspects of embodiments of the present invention may be performed using various means, such as integrated semiconductor circuits, computer-readable instructions organized into one or more programs, or some combination of hardware and software.

In another embodiment, the present invention provides for method of increasing spectral efficiency in a wireless cellular system by optimizing azimuth angles instead of optimising tilt angle of antennas. The focal points of cells are calculated using any of the methods as described above, and then instead of optimising tilts, azimuth angles of the cells are optimised with respect to these focal points.

In yet another embodiment, instead of optimising the tilt angle of antennas alone, both angle of tilt and azimuth angle are jointly optimised with respect to the focal points of the cells determined through the presented methods.

In yet another embodiment of the present invention, in addition to the optimization of tilt angles of an antenna of a base station, the antenna tilts of relay station or Femto cell may also be optimised using any one of the method as described above.

In yet another embodiment of the invention, the spectral efficiency in a wireless cellular system is optimized to enhance indoor service levels. This is possible by basing focal point calculation on the indoor locations of interest where the coverage has to be optimised. i.e. if there is single indoor location in cell where service level has to be optimised, this indoor location can be taken as the focal point of that cell. If there are more than one such indoor locations, these locations can be considered as general user locations and focal point determination process illustrated in FIG. 6 and explained above can be applied to determine single focal point to represent multiple indoor locations where service level has to be optimised in a cell.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is understood that various omissions, substitutions of equivalents are contemplated as circumstance may suggest or render expedient, but is intended to cover the application or implementation without departing from the spirit or scope of the claims of the present invention.

We claim:

1. A method of optimizing tilt angle of antennas of a plurality of cells in a wireless cellular system, the method comprising the steps of:
   determining autonomously a focal point of each cell of the plurality of cells whose angle of tilts is to be optimized is based on user demographics;
   determining jointly optimal tilt values of the antennas of the plurality of cells based on the determined focal points; and
   configuring the tilt angle of the antennas of the plurality of cells based on said optimal tilt values,
   wherein the step of determining autonomously the focal point of each cell further comprising the steps of:
   dividing each cell of the plurality of cells into a finite number of virtual bins;
   gathering user measurement report from each virtual bin from the finite number of virtual bins;
   assigning a weight to each virtual bin representing a significance of the bin;
   ascertaining whether a focal point update is required for each cell based on the weightage assigned to each bin of the each cell;
   determining a value of tilt of the cell that maximizes the weighted average spectral efficiency in all bins in the cell;
   mapping the determined value of tilt into a locus of points in the said cell;
   determining a point on the locus that minimizes the weighted sum distance from all virtual bins in the cell; and
   setting the point on the locus as the focal point of the cell.

2. The method of claim 1, wherein the method is implemented in a centralized manner.

3. The method of claim 2, wherein the centralized manner includes all the cells of the wireless cellular system whose tilt angle of the antenna is to be optimized.

4. The method of claim 1, wherein the method is implemented in a distributed manner.

5. The method of claim 4, wherein the distributed manner includes selection of a cluster of cells of the plurality of cells of the wireless cellular system whose tilt angle of the antenna is to be optimized.

6. The method of claim 5, wherein one cell of a cluster of cells is designated as a cluster head, wherein the cluster head is capable of,
  receiving the autonomously determined the focal point of each cell of the cluster of cells,
  determining jointly optimal tilt values of the antennas of all the cells of the cluster of cells, and
  forwarding the optimal tilt value of the antenna to each cell of the cluster of cells for configuring the angle of tilt of each antenna of the cluster of cells.

7. The method of claim 1, wherein said ascertaining the focal point update is based on measuring predetermined configuration parameters selected from a group comprising of user activity level, radio link failure rates, and an operator policy.

8. The method of claim 1, wherein the significance of bin is determined as a function of user density and activity level in each virtual bin from the finite number of virtual bins.

9. The method of claim 1, wherein the step of determining autonomously the focal point of each cell is based on the relay station or femto cell locations, the step of determining autonomously the focal point further comprising the steps of:
  gathering configuration parameters of each cell of the plurality of cells in the wireless cellular system;
  ascertaining whether the focal point update is required for each cell based on configuration parameters of the each cell;
  considering physical locations of a plurality of relay stations or femto cells as physical locations of users and determining the focal point of the cell based on the user demographics when the cell comprises a plurality of relay stations or femto cells; and
  assigning weightage to the focal point of the cell depending on significance of the relay station or the femto cell.

10. The method of claim 1, wherein the step of determination of focal point of the cell based on user demographics comprising the steps of:
  dividing each cell into the finite number of virtual bins;
  gathering user measurement report from each virtual bin from the finite number of virtual bins;
  assigning the weight to each virtual bin representing the significance of the bin;
  ascertaining whether the focal point update is required for each cell based on the weightage assigned to each bin of the cell;
  determining the value of tilt of the cell that maximizes the weighted average spectral efficiency in all bins in the cell;
  mapping the determined value of tilt into the locus of points in the said cell;
  determining the point on the locus that minimizes the weighted sum distance from all virtual bins in the cell; and
  setting the point on the locus as the focal point of the cell.

11. The method of claim 1, wherein the step of determining autonomously the focal point of the cell is based on coverage or service level, the step of determining autonomously the focal point further comprising the steps of:
  gathering user measurement reports in each cell of the plurality of cells in the wireless cellular system;
  ascertaining whether the focal point update is required for each cell based on user measurement reports of the each cell;
  determining points in the cell of the wireless cellular system with coverage or service below a threshold level;
  considering the points with coverage or service below the threshold level as physical locations of users; and
  determining the focal point of the cell based on the user demographics when the cell comprises points with coverage or service below the threshold level.

12. The method of claim 11, wherein the step of determination of focal point of the cell based on user demographics comprising the steps of:
  dividing each cell into the finite number of virtual bins;
  gathering user measurement report from each virtual bin from the finite number of virtual bins;
  assigning the weight to each virtual bin representing the significance of the bin;
  ascertaining whether the focal point update is required for each cell based on the weightage assigned to each bin of the cell;
  determining the value of tilt of the cell that maximizes the weighted average spectral efficiency in all bins in the cell;
  mapping the determined value of tilt into the locus of points in the said cell;
  determining the point on the locus that minimizes the weighted sum distance from all virtual bins in the cell; and
  setting the point on the locus as the focal point of the cell.

13. A method of autonomously determining a focal point of a cell based on user demographics in a wireless cellular system, the method comprising the steps of:
  dividing each cell of the plurality of cells into a finite number of virtual bins;
  gathering user measurement report from each bin from the finite number of virtual bins;
  assigning a weight to each virtual bin representing the significance of the bin;
  ascertaining whether a focal point update is required for each cell based on the weightage assigned to each bin of the each cell;
  determining a value of tilt of the cell that maximizes the weighted average spectral efficiency in all bins in the cell;
  mapping the determined value of tilt into a locus of points in the said cell;
  determining a point on the locus that minimizes the weighted sum distance from all virtual bins in the cell; and
  setting the point on the locus as the focal point of the cell.

14. The method of claim 13, wherein said ascertaining focal point update is based on measuring predetermined configuration parameters selected from a group comprising of user activity level, radio link failure rates and operator policy.

15. The method of claim 13, wherein the significance of bin is determined as a function of user density and activity level in each virtual bin from the finite number of virtual bins.

16. A method of autonomously determining a focal point of a cell based on relay station or femto cell locations in a wireless cellular system, the method comprising the steps of:
gathering configuration parameters of each cell of the plurality of cells in the wireless cellular system;
ascertaining whether a focal point update is required for each cell based on configuration parameters of the each cell;
considering physical locations of one or more relay stations or femto cells as physical location of users;
determining the focal point of the cell based on the user demographics when said cell comprises a plurality of relay stations or femto cells; and
assigning weightage to the focal point of the cell depending on significance of the relay station or femto cell,
wherein the step of determining of the focal point of the cell based on user demographics further comprising the steps of:
dividing each cell into a finite number of virtual bins;
gathering user measurement report from each virtual bin from the finite number of virtual bins;
assigning a weight to each virtual bin representing the significance of the bin;
ascertaining whether the focal point update is required for each cell based on the weightage assigned to each bin of the cell;
determining a value of tilt of the cell that maximizes the weighted average spectral efficiency in all bins in the cell;
mapping the determined value of tilt into a locus of points in the said cell;
determining a point on the locus that minimizes the weighted sum distance from all virtual bins in the cell; and
setting the point on locus as the focal point of the cell.

17. The method of claim 16, wherein said configuration parameters are selected from a group comprising of user demography, relay stations or femto cells locations and their activity in the wireless cellular system.

18. The method of claim 16, wherein said ascertaining focal point update is based on measuring predetermined configuration parameters selected from a group comprising of user demography, operator policy, and a optimization schedule.

19. A method of autonomously determining a focal point of a cell based on coverage or service level in a wireless cellular system, the method comprising the steps of:
gathering user measurement reports in each cell of the plurality of cells in the wireless cellular system;
ascertaining whether a focal point update is required for each cell based on user measurement reports of the each cell;
determining points in the cell of the wireless cellular system with coverage or service below a threshold level;
considering the points with coverage or service below the threshold level as physical location of users; and
determining the focal point of the cell based on the user demographics when the cell comprises more than one such points with coverage or service below the threshold level,
wherein the step of determination of the focal point of the cell based on user demographics further comprising the steps of:
dividing each cell into a finite number of virtual bins;
gathering user measurement report from each virtual bin from the finite number of virtual bins;
assigning a weight to each virtual bin representing the significance of the bin;
ascertaining whether a focal point update is required for each cell based on the weightage assigned to each bin of the cell;
determining a value of tilt of the cell that maximizes the weighted average spectral efficiency in all bins in the cell;
mapping the determined value of tilt into a locus of points in the said cell;
determining a point on the locus that minimizes the weighted sum distance from all virtual bins in the cell; and
setting the point on locus as the focal point of the cell.

20. The method of claim 19, wherein said ascertaining focal point update is based on measuring predetermined configuration parameters selected from a group comprising of an user demography, an operator policy, and an optimization schedule.

* * * * *